United States Patent [19]
Winchell

[11] 4,087,106
[45] May 2, 1978

[54] CAMBERING VEHICLE

[75] Inventor: Frank J. Winchell, Orchard Lake, Mich.

[73] Assignee: General Motors Corporation, Detroit, Mich.

[21] Appl. No.: 649,967

[22] Filed: Jan. 19, 1976

Related U.S. Application Data

[63] Continuation-in-part of Ser. No. 578,739, May 19, 1975, abandoned.

[51] Int. Cl.² ............................................. B62K 5/00
[52] U.S. Cl. ................................ 280/220; 180/6 R; 180/26 R; 280/8; 280/12.1; 280/16; 280/87.04 R
[58] Field of Search ............ 280/87 R, 87 B, 87.04 R, 280/87.04 A, 87.1, 6.11, 21 R, 21 A, 14, 15, 16, 17, 12.1, 12 H, 111, 112 R, 112 A, 113, 282, 283, 8, 11; 180/25 R, 26 R, 41, 6 R

[56] References Cited
U.S. PATENT DOCUMENTS

| | | | |
|---|---|---|---|
| 3,123,375 | 3/1964 | Courtney | 280/16 |
| 3,237,961 | 3/1966 | McMullen | 280/87 R |
| 3,540,750 | 11/1970 | Berger | 280/16 |
| 3,645,558 | 2/1972 | McMullen | 280/87 R X |

*Primary Examiner*—Joseph F. Peters, Jr.
*Assistant Examiner*—Terrance L. Siemens
*Attorney, Agent, or Firm*—Charles R. White

[57] ABSTRACT

This three-point contact cambering vehicle with lateral and fore and aft stability comprises an upright main frame, a pair of elongated trailing arms having forward end portions pivotally connected to opposite sides of the main frame on a common lateral axis and extending rearwardly therefrom, a stabilizer connection between the arms supported by the main frame interconnecting front portions of the arms to each other so that the arms move in equal and opposite directions in response to cambering of the vehicle. The free end portions of the trailing arms support wheels or other contact means. The main frame supports a steerable front wheel or other contact operatively connected to a steering mechanism manually manipulated by a vehicle operator standing and shifting weight in a natural manner on left and right foot pads secured to the respective free ends of the trailing arms. This is a light weight vehicle providing improved stability at rest and stability and maneuverability in motion.

15 Claims, 17 Drawing Figures

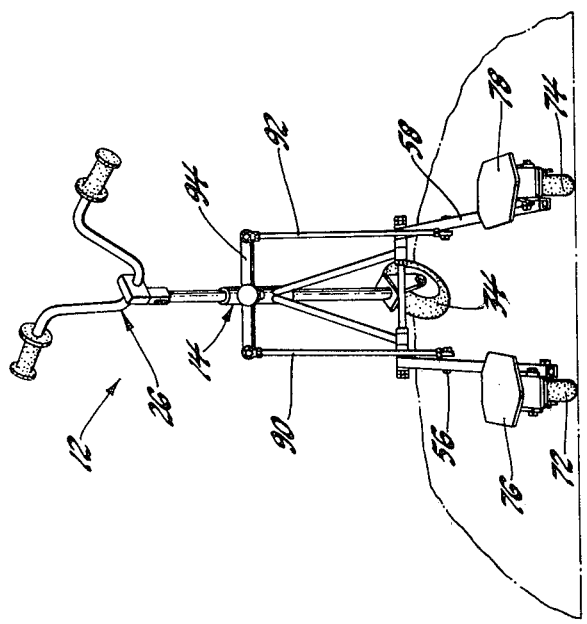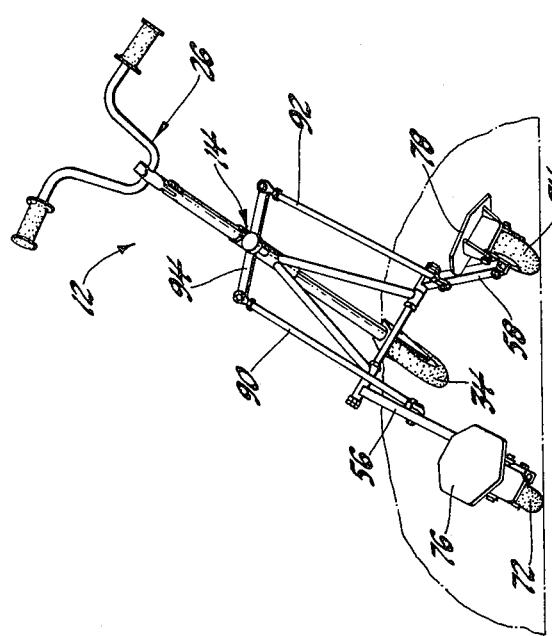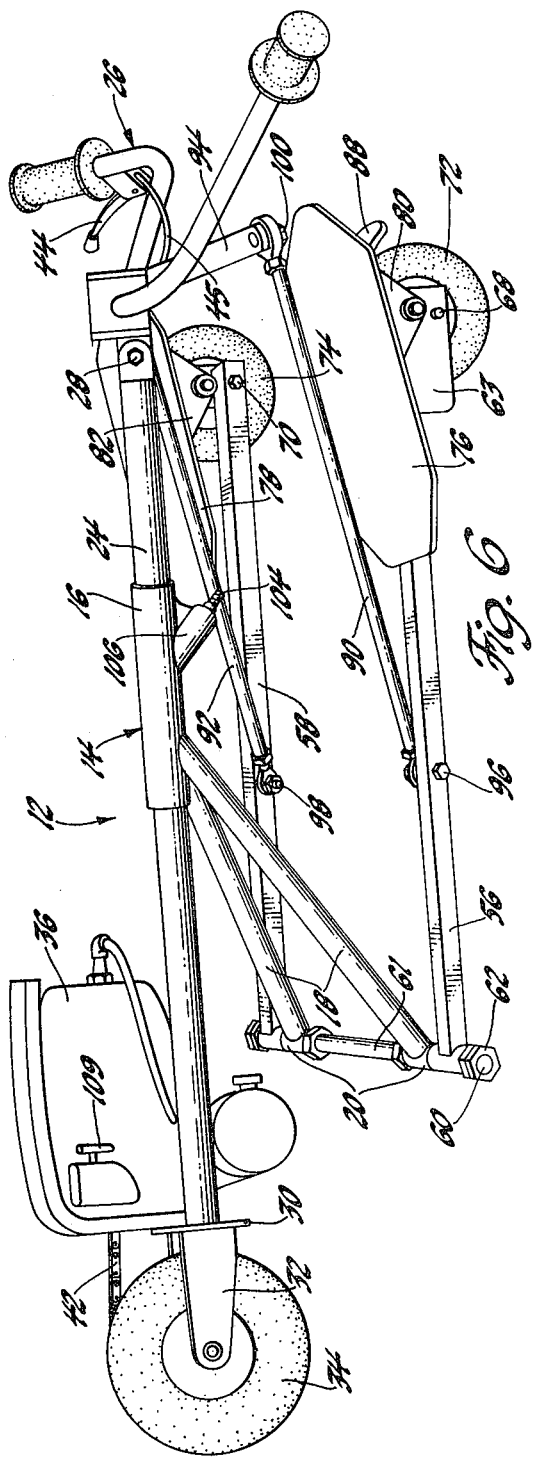

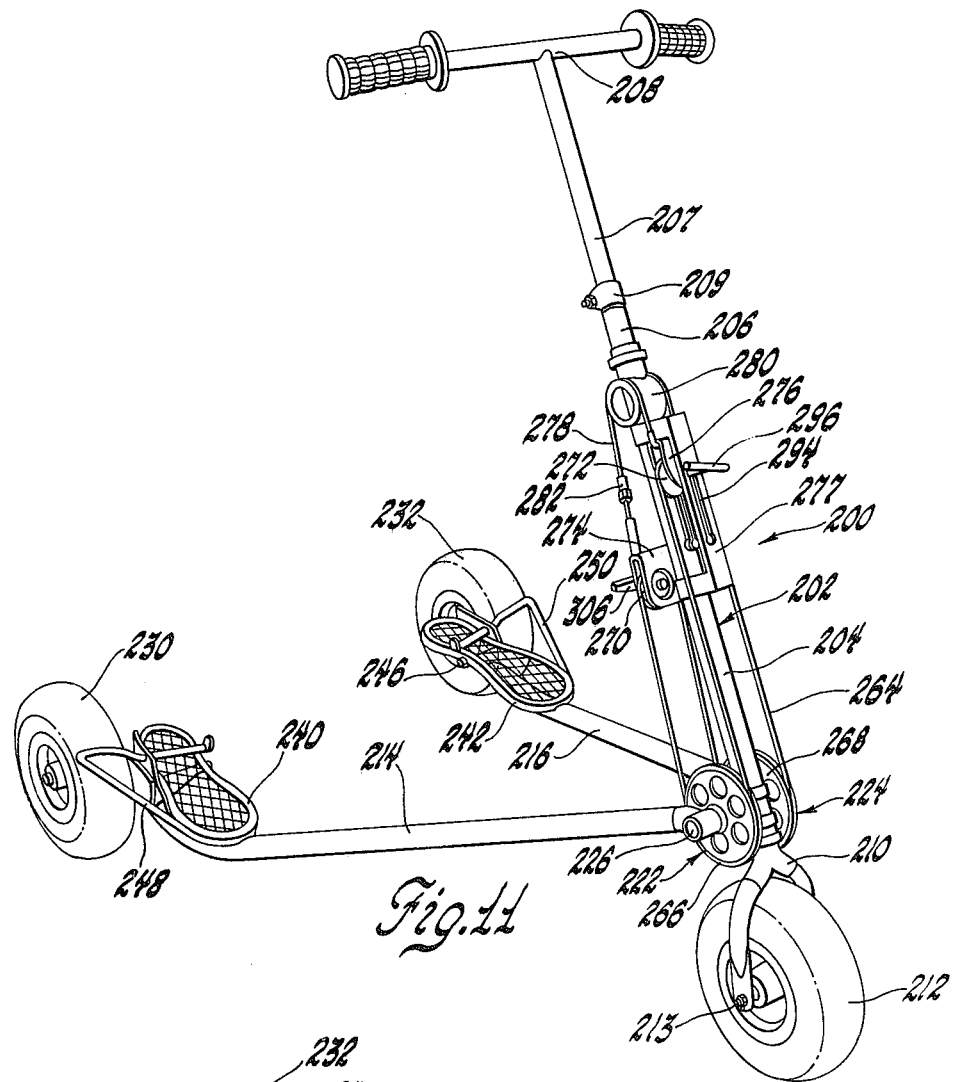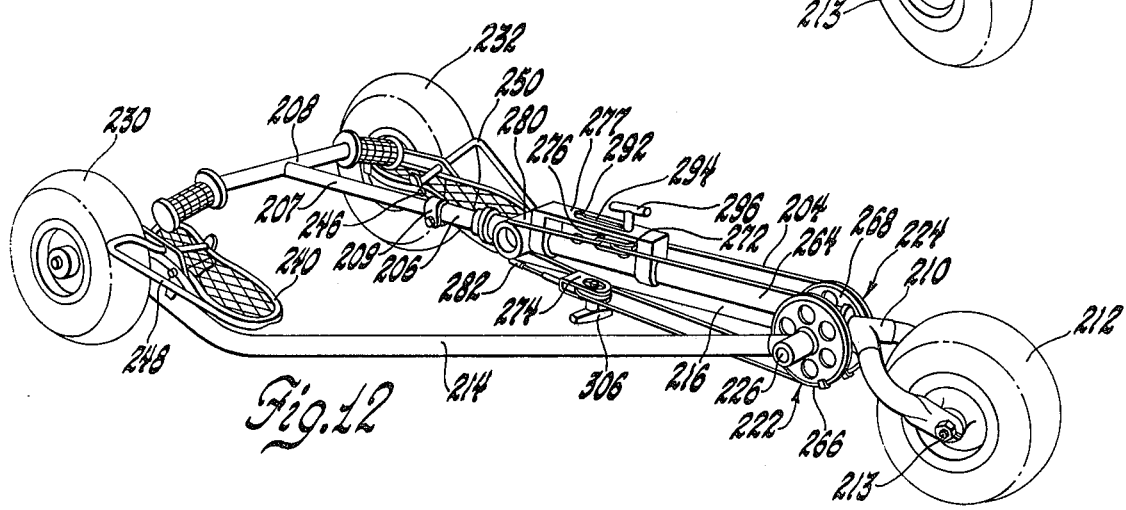

CAMBERING VEHICLE

This is a Continuation-In-Part of application Ser. No. 578,739, filed May 19, 1975, for "Cambering Vehicle", now abandonded.

This invention relates to vehicles and more particularly to a new and improved three-point cambering vehicle having a steerable front contact and laterally spaced rear contacts all arranged for cambering and continuous engagement with a support surface during cornering and other maneuvers to provide for improved vehicle maneuverability and stability.

Prior to the present invention three-point contact vehicles have had various suspension arrangements for their wheels or other surface contact means to stabilize the vehicle during operation including high speed cornering maneuvers. By way of example, in one prior art vehicle, parallelogram linkage and stabilizing spring means are employed to mount the rear wheels of a three-wheel vehicle on the end of a longitudinally extending frame so that the frame and wheels camber by equal amounts when the vehicle is rolled during cornering. However, with such wheel suspension the vehicle is susceptible to tilting and instability when one of the rear wheels strikes an obstruction. Also this prior art vehicle does not permit the operator to make full use of his body in cambering the vehicle for vehicle control purposes.

This invention, in contrast to the prior art, does not involve complex wheel suspension construction and permits the operator to naturally control camber by leaning his body and shifting his weight from one foot to the other to roll the vehicle for cornering or other vehicle operations. Instead of leaning into a turn the operator may optionally remain upright and tilt the vehicle into the turn for high speed cornering. This invention permits the operator to take full advantage of his inherent ability to make continuous and instantaneous adaption to lateral acceleration or to adjust to varying terrain undulations. In this invention the operator may independently select the degree of camber and wheel turn in accordance with his natural stance. One of the main features of this invention is to provide a light weight three-point vehicle which is highly maneuverable on which the operator naturally stands and which provides optimized lateral and fore and aft stability when the vehicle is in motion and when stationary.

One preferred embodiment of this invention incorporates a frame which is articulated and is therefore flexible. The frame has a main front portion which supports a powered steerable front wheel at a fixed caster angle. The rearward portion of the frame includes a pair of laterally-spaced and trailing swing arms which are pivoted to and on opposite sides of the front portion for limited turning about a horizontal axis. Each arm carries a rear wheel at its free end and the arms are operatively connected to each other and to the front portion of the frame by a bell crank linkage or an equivalent stabilizer which allows only equal and opposite turning movement of the arms when the vehicle is tilted to either side. With this arrangement camber steering can be accomplished in addition to slip angle steering used in conventional multi-wheeled vehicles. In addition, the trailing arms provide appropriate support of the operator so that the operator can make full use of his body to tilt the vehicle for increased maneuverability and stability as well as adjust to terrain undulations. In particular each trailing arm of the flexible frame supports a foot pad disposed by each of the rear wheels which is rockably mounted so that the operator while imposing his weight on the pads can lean slightly forward toward the front driving wheel to increase drive wheel traction. The foot pads can be rocked in a rearward direction by the weight of the operator to frictionally engage the rear wheels for vehicle braking while simultaneously decreasing drive traction by reducing front wheel loading.

In another embodiment of the invention the vehicle may be equipped with a powered snow tire and rear skis for operation on snow and ice. In another preferred embodiment of the invention the trailing arms are interconnected by cable and pulley stabilizer means and the vehicle is manually propelled when the operator shifts his weight from one foot to the other as the vehicle is guided in a sinuous path. In still other preferred embodiments of the invention ice skates and skis are employed as the contact for the support surface instead of wheels.

An object, feature and advantage of this invention is to provide a new and improved cambering vehicle with steerable front ground contact means and laterally spaced rear ground contact means mounted on trailing arms which are swingable in planes on opposite sides of the vertical plane through the longitudinal axis of the vehicle so that the ground contact means camber by an amount equal to the tilt applied to the vehicle by the operator as he leans in a natural manner during cornering maneuvers.

Another feature, object and advantage of this invention is to provide a new and improved narrow track vehicle with high lateral acceleration potential produced by camber steering having a steerable front wheel and laterally spaced rear wheels mounted on trailing arms that are pivoted on a lateral axis through a front portion of the frame of the vehicle for swinging movement in opposite up and down directions to permit the vehicle to be cambered.

Another object of this invention is to provide a three-wheeled cambering vehicle having an articulated frame and incorporating a new and improved suspension for a pair of rear wheels which permits the vehicle operator to stand above or along the axis of the rear wheels and which swing in separate planes spaced a predetermined distance from a tiltable longitudinal axial plane bisecting the vehicle to provide for rear wheel camber when the operator tilts the vehicle on cornering maneuvers.

Another feature, object and advantage of this invention is to provide a new and improved cambering vehicle having a steerable front driving wheel and a pair of laterally spaced rear wheels incorporating rockable foot pads for the vehicle operator that allow the operator to increase drive traction by impressing body weight on the front portion of the foot pads and the front wheel and to reduce front wheel loading and drive traction while braking by rocking the foot pads in a rearwardly direction causing their frictional engagement with the rear wheels.

Another feature, object and advantage of this invention is to provide a new and improved three-wheel cambering vehicle having a flexible frame comprising a main frame supporting a steerable front wheel and a pair of trailing arms; the arms support a pair of rear wheels at their free ends and are interconnected at their forward ends to the main frame and to each other for simultaneous equal and opposite swinging movement with respect to each other so that the vehicle and wheels can be cambered at will by an operator.

Another feature, object and advantage of this invention is to provide a new and improved three-point contact cambering vehicle with the contacts being skis, ice skates or wheels having a manually steerable front center contact and left and right rear contacts arranged on trailing arms and interconnected with each other for up and down swinging movement in equal and opposite directions so that the operator can optimize vehicle operation while standing in a natural manner on the vehicle and providing an instinctive input into the vehicle by leaning and shifts in body weight as the vehicle traverses a course.

These and other features, objects and advantages of this invention will be more apparent from the following detailed description and drawings in which:

FIG. 4 is an end view of the first embodiment of the vehicle with some parts removed illustrating right camber for cornering;

FIG. 5 is an end view of the vehicle of FIG. 4 in an upright position making a right corner turn without camber;

FIG. 6 is a perspective view of the first embodiment of the vehicle in a collapsed position for stowage;

FIG. 11 is a perspective view of a fourth embodiment of the invention;

FIG. 12 is a perspective view of the vehicle of FIG. 11 in a collapsed position;

Figure 1:
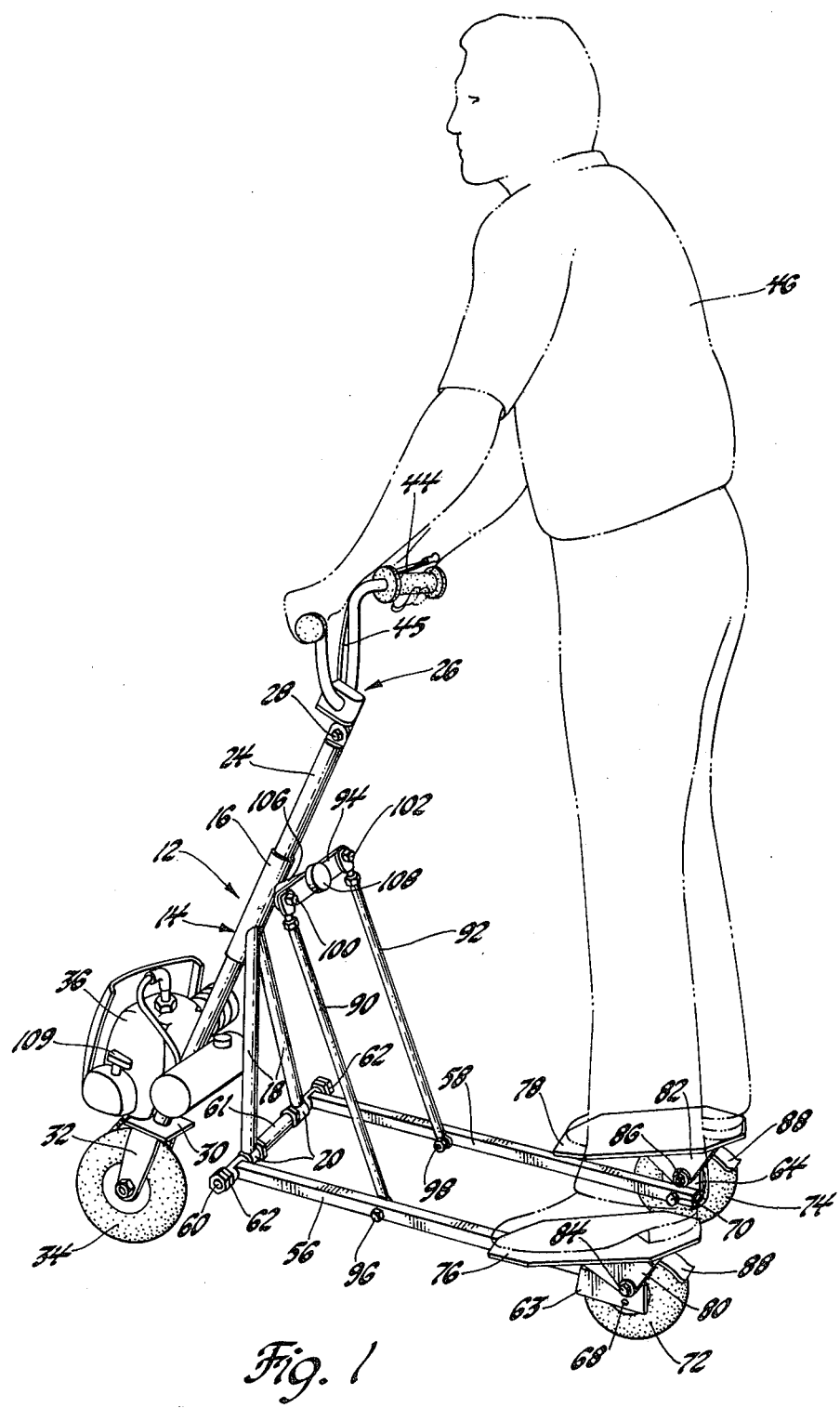
FIG. 1 is a perspective view of a first embodiment of the vehicle.

Turning now in greater detail to the drawings there is shown in FIG. 1 a cambering vehicle 12 which has a front frame portion 14 comprising an inclined tubular sleeve 16 and a pair of struts 18 arranged in a V joined to sleeve 16 which extend downwardly and terminate in horizontally extending collars 20.

The tubular sleeve 16 axially locates and rotatably supports a rearwardly inclined steering shaft 24 which has an upper end secured to a handle bar assembly 26 by threaded fastener means 28. The lower end of the steering shaft is secured to a flat support plate 30 and to a fork 32 for rotatably supporting a front drive wheel 34.

Figure 7:
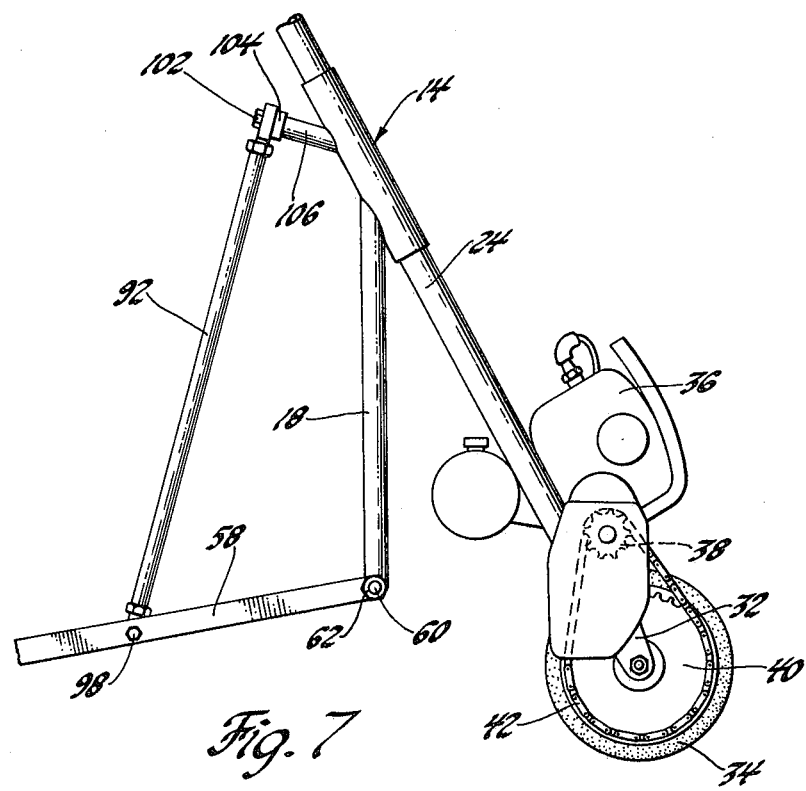
FIG. 7 is a side view obverse of the FIG. 2 view showing another portion of the first embodiment of the vehicle.

The flat plate 30 supports a suitable power plant for driving the vehicle such as a conventional internal combustion engine 36 secured to the support plate. If desired, the plate 30 may support a battery and electric drive motor. The output of engine 36 is shown in FIG. 7 as a rotatable sprocket 38 which drives a front wheel sprocket 40 through a chain 42. The engine incorporates a conventional centrifugal clutch which drivingly engages at predetermined engine speed above idle for vehicle drive and disengages at idle speed so that there is no power flow to the drive wheel under idling conditions. If desired, the front wheel may be driven by a conventional motorcycle transmission.

Engine speed is controlled by throttle control lever 44 mounted on the right wing of the handle bar assembly and connected to the engine throttle by cable 45. The control lever 44 is manually adjusted by the operator 46 to set the engine at selected throttle openings from idle to wide open throttle.

Figure 2:
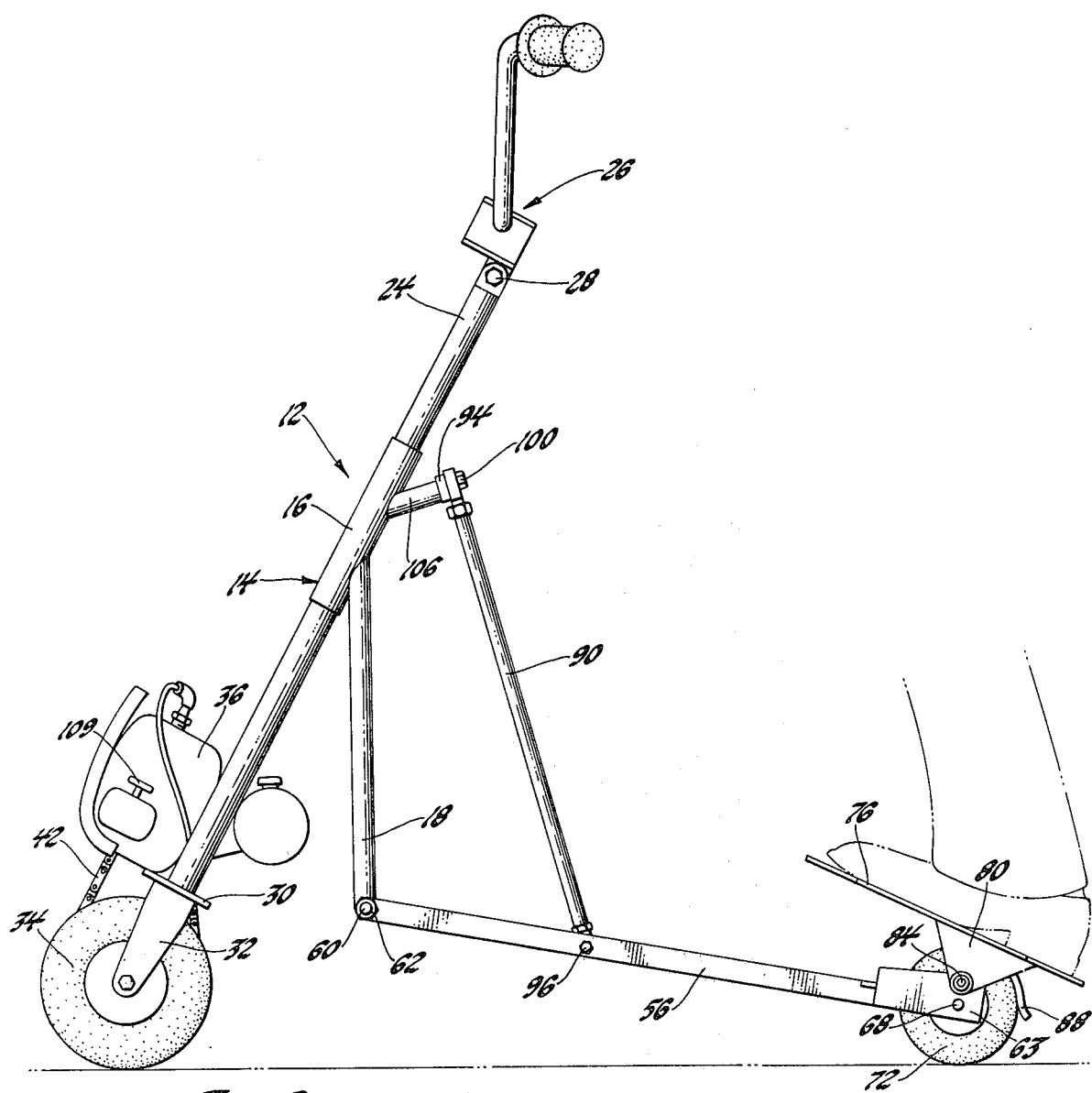
FIG. 2 is a side elevational view of the vehicle shown in FIG. 1.
Figure 3:
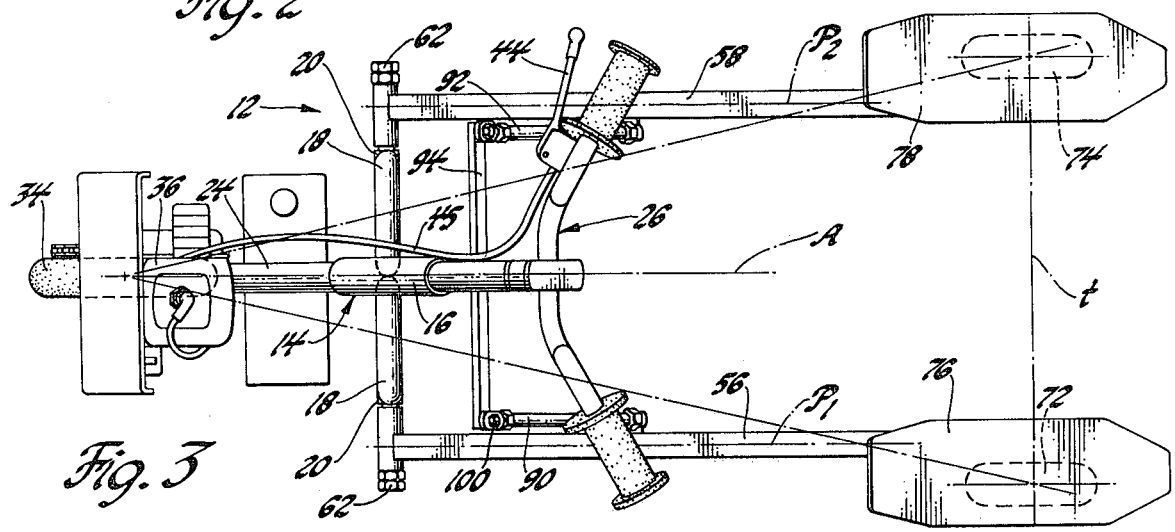
FIG. 3 is a top view of the vehicle shown in FIG. 1.

The vehicle also has a pair of laterally spaced trailing arms 56 and 58 extending rearwardly from front frame portion 14. As shown in FIGS. 1-3 the arms are mounted for limited swinging movement on a pivot shaft 60 which laterally extends through the eyes of axially aligned frame collars 20 and through a cylindrical spacer 61 connecting the collars to each other. The pivot shaft is maintained in position by retainer nuts 62 threaded on the ends of the shaft outboard of the ends of the trailing arms. The trailing arms 56 and 58 are of equal dimensions and extend rearwardly from the laterally extending pivot rod 60 and each has a pair of laterally spaced support brackets 63 and 64 welded to the outboard sides thereof. Axle shafts 68 and 70 extend through these brackets and through the ends of the trailing arms to rotatably support rear wheels 72 and 74, respectively. As shown by FIG. 3 the trailing arms 56 and 58 respectively swing in planes $P_1$ and $P_2$ having a predetermined relationship with each other and with a centralized axial plane through roll axis A bisecting the vehicle. The planes may be parallel and their relationship remains the same as they are rolled when the vehicle is cambered.

Foot pads 76 and 78 for supporting the operator 46 are disposed above wheels 72 and 74, respectively, and are mounted for limited rocking motion with respect to the trailing arms 56 and 58. As shown, each pad has a pair of depending laterally spaced ears 80 and 82 which straddle the corresponding rear wheel. The ears 80 and 82 are pivotally connected to their associated support brackets 63 and 64 by pivot bolt means 84 and 86 so that the foot pads can be rocked between the inclined forward position of FIG. 1 where the pads 76, 78 engage their respective arms 56, 58 and the inclined rearward position for braking shown in FIG. 2. Because of the forward tilt of the foot pads 76 and 78 shown in FIG. 1, the operator will naturally tend to lean forwardly on the front part of the foot pads and on the handle bars thus applying body weight to the front drive wheel. Under these conditions the load on the front drive wheel is naturally increased for improved vehicle traction and performance. The foot pads, if desired, may be arranged with little or no forward tilt in normal position.

Secured to the underside of each foot pad in alignment with the corresponding rear wheel is an arcuate friction brake member 88. These brake members are adapted to frictionally engage the peripheral surface of the associated rear wheel for vehicle braking when the operator transfers his weight to his heels to rock the pads rearwardly from the FIG. 1 position to the FIG. 2 position. When the operator rocks rearwardly for braking, load is simultaneously removed from the front wheel to reduce driving traction in those vehicle arrangements that employ a centrifugal clutch.

The trailing arms 56 and 58 of the frame are interconnected to each other and to the front frame member 14 by a stabilizer or bell crank linkage comprising generally parallel side links 90 and 92 and by an upper bell crank 94. The side links are pivotally connected at their lower end to arms 56 and 58, respectively, by pivot bolt members 96 and 98. The upper ends of links 90 and 92 are pivotally connected to the bell crank 94 by pivot bolt means 100 and 102. The bell crank 94 is pivotally connected to a threaded pivot pin 104 that projects axially from an extension 106 from the front frame member 14. Pivot pin 104 is inserted through a circular opening formed centrally in the cross link 94 and a retaining knob 108 is threaded on the end of the pivot pin to retain the bell crank thereon. Normally the bell crank 94 is rocked about the axis provided by the pin 104 when the vehicle is cambered. However, to completely stabilize the vehicle at rest, knob 108 can be advanced on the pivot pin to a position whereby the bell crank is held fast to the frame extension 106. With the bell crank 94 rigidly secured to the frame, the side links 90 and 92 and trailing arms are rigidly secured so that the vehicle is held stationary in an upright position for parking purposes. Obviously, the vehicle could also be driven with the bell crank fixed, in which case cambering control would be lost but rockable traction and brake control would be retained.

With the laterally spaced rear wheels forming a foot support base and with the steerable front wheel having ground contact at a forward point on a longitudinal axis bisecting the base, a three-wheeled vehicle having maximized natural lateral stability for straight ahead and cornering operations at all speeds is provided. Since the center of gravity of the vehicle and operator is directly above the triangle $t$ defined by the wheel contact points with the ground during straight ahead driving, the vehicle is naturally stable. When the vehicle is cornered by the operator leaning into a turn, the resultant of gravitational and centrifugal forces is also naturally directed through triangle $t$ for stabilized turns.

The vehicle is readily mounted by stepping on the foot pads in any sequence and the handle bars 26 are gripped without any noticeable balancing effort. The operator merely assumes his normal stance or one with a slight hand pressure on the handle bar. Assuming that the vehicle engine has been started by a conventional recoil hand starter 109 and with the operator's body weight distributed on the front part of the foot pads, the throttle is opened by operator to proceed in a straight course. Lateral stability is provided by the natural upright stance of the operator. Assuming that a tight right turn is to be negotiated, the operator can turn the handle bar slightly to the right and readily lean into the turn, thus shifting weight to tilt or roll the vehicle about its roll axis as illustrated in FIG. 4. This rolling action causes the front end of the trailing arm 56 to be raised and the front end of trailing arm 58 to be lowered. Thus, arm 56 will pivot in its plane counterclockwise about pivot axis 60 and arm 58 will concurrently pivot in its plane clockwise about the axis 60 through the same angle. The bell crank linkage interconnecting the trailing arms and front wheel support ensures that the pivotal movement of the arms is equal and opposite. When the vehicle is rolled, all wheels remain in contact with the ground and camber by an amount equal to vehicle roll. When the operator leans into the corner to corner the vehicle, the resultant force due to gravity and centrifugal force passes through the triangle $t$ defined by the wheel contact points for maximized cornering stability. Since this triangular area is fairly large as provided by the basic structural dimensions of the vehicle, there is no need for critical positioning of the operator with respect to the wheels as with a motorcycle or other two-wheel vehicle. Additionally, there is no need for critical steering adjustments to keep a precise relationship between speed, turning radius and camber angle so that severe handling maneuvers can be accomplished with ease and precision with minimal driving skill.

Camber steering to the left is opposite to right camber steering described above and further description of such turns is therefore not necessary. It will be appreciated however that when traversing a winding path, the operator can make maximum use of his natural leaning ability to lean from one side to the other to accordingly use ground reaction to produce a rolling movement to camber the vehicle to the left or right to compensate for centrifugal forces occurring during such vehicle maneuvers. If desired the operator may remain standing in an upright position and tilt the vehicle to either side into a turn for cornering. In any event, with camber steering the steerable front wheel requires little angular change for tight turn operation.

While cornering ability is sacrificed, turns without camber steering can also be made with this invention. As shown in FIG. 5, for example, the handle bar 26 assembly can be turned to the right to move the front wheel through a relatively large angle while the vehicle is maintained upright by the vertical stance of the operator (not shown) to steer the vehicle into a desired right turn. At slow speeds, there is obviously little or no tendency on the part of the operator to lean into a turn.

Stability is provided when the vehicle is running over uneven ground by reason of the forward location of the trailing arm pivots and bell crank linkage. If there is a rise in the ground under one side of the vehicle, the rear wheel encountering the obstruction may rise without substantial tilt of the vehicle as would occur in other three-wheel vehicles with comparable lateral wheel base. Moreover, the operator may maintain his vertical posture while one wheel rises.

FIGS. 1 – 3 show the vehicle with the main frame held at a fixed rake angle or inclination by the stabilizer or bell crank linkage.

For portability or storage the hand knob 108 can be removed from pivot bolt 104 so that the bell crank linkage 90, 92 and 94 can be disconnected from the steering column and the vehicle folded into a collapsed position as illustrated in FIG. 6. In this folded position the steering column is positioned closely adjacent to the trailing arms to provide a highly compact package so that the vehicle can be easily carried or stored using minimal space.

Figure 8:
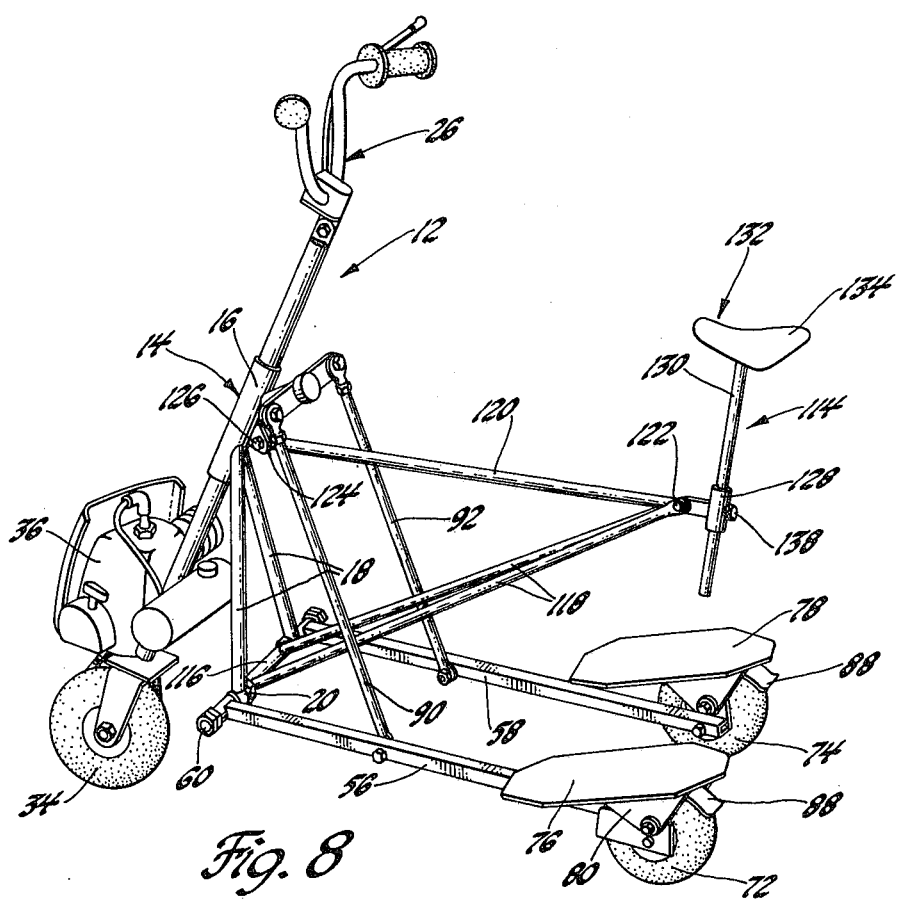
FIG. 8 is a perspective view of a vehicle similar to FIG. 1 but modified with a seat for the vehicle operator.

FIG. 8 discloses substantially the same vehicle as illustrated in FIG. 1 with similar numerals depicting similar parts, incorporating an optional seating structure 114 for supporting the vehicle operator. This structure which may be readily attached to the frame comprises a central tubular spacer 116 mounted on the pivot shaft 60 between collars 20 which has a pair of diagonally extending tubular struts 118 that converge to terminal positions on opposite sides of the free end of longitudinally extending upper bar 120. Threaded fastener means 122 secure the ends of the struts 118 to the upper bar 120 which in turn is secured to projecting ears 124 of the frame by a bolt 126. The upper bar 120 terminates at its free end in a tubular sleeve 128 which receives a cylindrical post 130 of a seat assembly 132.

The seat assembly has an operator's seat 134 secured in a conventional manner to the upper end thereof. The seat assembly is secured in adjusted vertical position to suit the operator's physique by tightening a set screw 138 threaded through the wall of the sleeve 128 into engagement with the seat post.

In operation of this embodiment, the operator can sit on the seat and rest his feet on the foot pads 76, 78 supported by the trailing arms 56 and 58 which provide good lateral stability. As in the embodiment of FIG. 1, the foot pads are pivoted on the trailing arms to tilt forwardly so that the operator can stand and lean forward to increase loading on the front wheel when increased traction is desired. When the pads are tilted rearwardly by the operator shifting his weight to the rear thereof, brakes 88 engage the rear wheels 72 and 74 for vehicle braking. Riding and control of the vehicle of FIG. 8 is similar to that of a conventional bicycle or motorcycle but with much improved lateral stability at rest and low speeds. The vehicle can be readily cambered by the operator by leaning his upper torso and/or shifting his foot pressure to the left or right as desired for left and right cornering. For improved control during high speed cornering or when traversing a winding course requiring rapid changes between left and right camber, the operator can readily raise from the seat and stand on the foot pads and lean in either direction to maximize the use of his body weight for cambering the vehicle.

Figure 9:
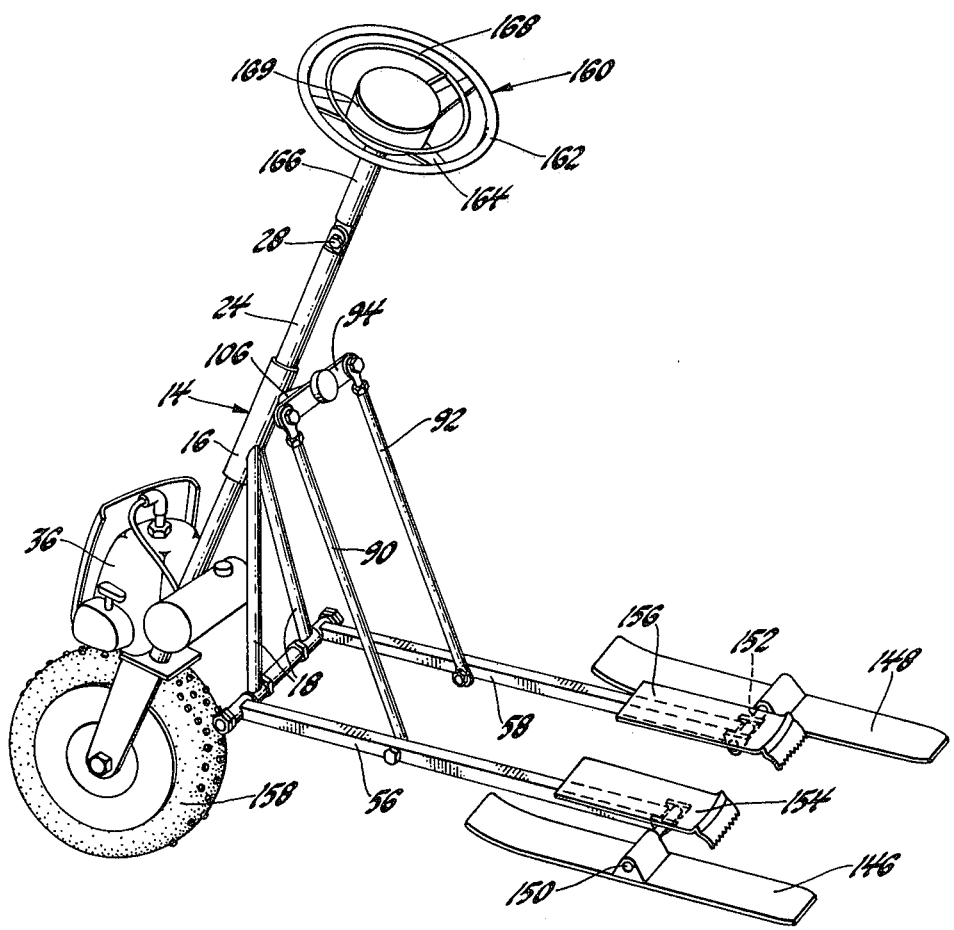
FIG. 9 is a perspective view similar to FIG. 1 illustrating a second embodiment of the invention.

FIG. 9 illustrates another variation of the cambering vehicle of this invention and incorporates skis 146 and 148 for gliding support on snow in place of the rear wheels of the previous embodiments. As shown, the skis are mounted on pivot shafts 150, 152 which are secured to the free ends of trailing arms 56 and 58. In addition to pivotally supporting skis 146 and 148, the pivot shafts 150 and 152 also pivotally mount foot pads 154 and 156 on which the operator stands. As in the previous embodiments, the operator can tilt the foot pads forward so that his body weight loads the steerable front snow tire 158 for increased traction. When the pads are tilted rearwardly, the rear ends thereof dig into the snow for vehicle braking. A steering wheel assembly 160 is employed in place of the handle bar assembly of the previous embodiment to provide an alternate form of steering control. The steering wheel assembly comprises a circular steering wheel 162 connected by radial spokes 164 to a central shaft 166. The central shaft is connected to the steering column by the threaded fastener means 28 so that the steering wheel can be readily turned to any position. If desired the steering wheel of this embodiment or the handle bar assembly of the other embodiments of the vehicle can be telescopically mounted with respect to the steering column 24 in any conventional manner for adjustment to different heights to suit the operator. Engine throttle opening is controlled by an inner ring 168 which is operatively connected to the engine throttle valve by suitable cable means (not shown). The ring is rotatably supported on the steering wheel assembly by rotatable central collar 169 and can be manually turned by the operator's fingers to open the throttle. Spring means (not shown) are preferably employed to return the throttle control ring to a closed throttle position when released by the operator.

The operation of the FIG. 9 embodiment of the vehicle is similar to operation of the previous embodiments. The operator standing on the foot pads can camber the vehicle, skis and front wheel for cornering. The active suspension system for the skis permits the vehicle to negotiate a tighter turn than would be otherwise possible. For operation on ice, ice skates could be substituted for the skiis.

Figure 10:
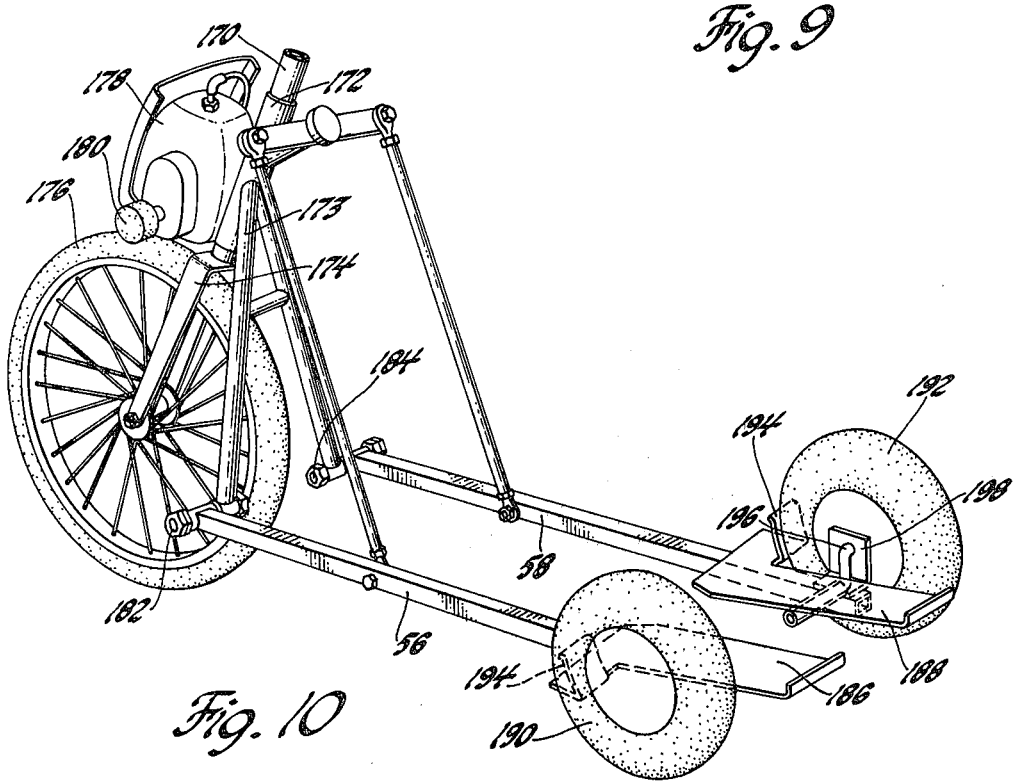
FIG. 10 is a perspective view similar to FIG. 1 illustrating a third embodiment of the invention.

FIG. 10 shows a portion of a cambering vehicle to illustrate another variation of this invention. As shown the vehicle has a steering shaft 170 mounted for turning movement in the tubular sleeve 172 of the frame 173. The steering shaft is drivingly connected to a large wheel fork 174 to accommodate the large diameter front wheel 176. The front wheel is frictionally driven by a motor 178 secured to the fork 174 by suitable support bracket means (not shown). The motor 178 has a friction roller 180 as an output which frictionally engages and drives the top of wheel 176. The front frame portion 173 is modified from the FIG. 1 embodiment to accommodate the large front wheel by replacing pivot shaft 60 with stub shafts 182 and 184 on which the trailing arms 56 and 58 are mounted for limited pivotal movement in planes parallel to the central plane bisecting the vehicle. To provide for greater stability with larger rear wheels left and right foot pads 186 and 188 are mounted for rocking movement below the rotational axis of the rear wheels 190 and 192 between a forward tilt position for vehicle drive and a rearward tilt position for vehicle braking. Integral braking members 194 laterally extending from the front ends of foot pads are adapted to engage the rear wheels when the foot pads are tilted rearwardly by the operator. As shown, the rear wheels in this variation of the invention are mounted on offset axles 196 extending through supporting bracket 198 secured to the trailing arms. With a lower center of gravity and larger wheels, another variation of the invention is provided. As in the previous embodiments of this invention this variation is a highly stable general purpose vehicle that is economical to operate and easy to maintain. Also as in the previous embodiments cambering is provided to increase vehicle controllability and improved steerability and maneuverability.

By having the vehicle operator standing directly over the rear wheels as in FIG. 1 or adjacent to the rear wheels as in FIG. 10, the operator can provide a natural input into the vehicle for improved vehicle stability at rest, as well as while moving. This input is similar to a person's instinctive response in maintaining equilibrium when standing as well as when walking or running. While on the vehicle of this invention, the operator feels as if he is supported directly by the ground and thus can instinctively adjust his weight distribution to his feet or lean his body for vehicle balancing purposes. With the rear wheels at the operator's feet and a steerable wheel provided forward of the rear wheels, improved manual guidance is available for the operator. When cornering using camber and slip angle steering of this invention, the manual angular input into the steerable front wheel is sharply reduced as compared to slip angle steering with conventional multi-wheel vehicles making the same turn. Particularly when standing on the foot pads, improved stabilized cornering for any given speed is obtained by cambering the vehicle an appropriate amount to offset centrifugal forces.

FIGS. 11 through 15 illustrate another embodiment of the vehicle of this invention which is particularly adaptable to be propelled in a forward direction by a natural input from the vehicle operator through the timed shifting of his weight from one foot to the other coordinated with the left and right cambered steering of the vehicle in a sinuous path. This embodiment of the vehicle is identified by reference numeral 200 and has a front frame portion 202 comprising an inclined and elongated cylindrical main frame 204 that axially locates and rotatably supports a tubular steering shaft 206 extending therethrough. The upper end of steering shaft 206 telescopically mounts the centralized connector shaft 207 of handle bar assembly 208. A clamp 209 carried by the upper end of shaft 206 can be constricted by conventional threaded fastener means to hold the handle bar assembly in adjusted position. The steering shaft 206 has a lower bifurcated end 210 which provides a fork for steerable front wheel 212. This wheel rotates on an axle 213 which extends transversely through and is supported by the fork. The vehicle has a pair of tubular trailing arms 214 and 216 which respectively have their forward ends secured in sockets 218 and 220 of right and left side pulley assemblies 222 and 224. The pulley assemblies 222 and 224 are mounted for turning movement on a horizontally extending pivot shaft 226 which is supported by the front frame portion 204. With this construction each arm is mounted for up and down swinging movement on the axis provided by the pivot shaft 226 and on opposite sides of main frame 204.

Figure 13:
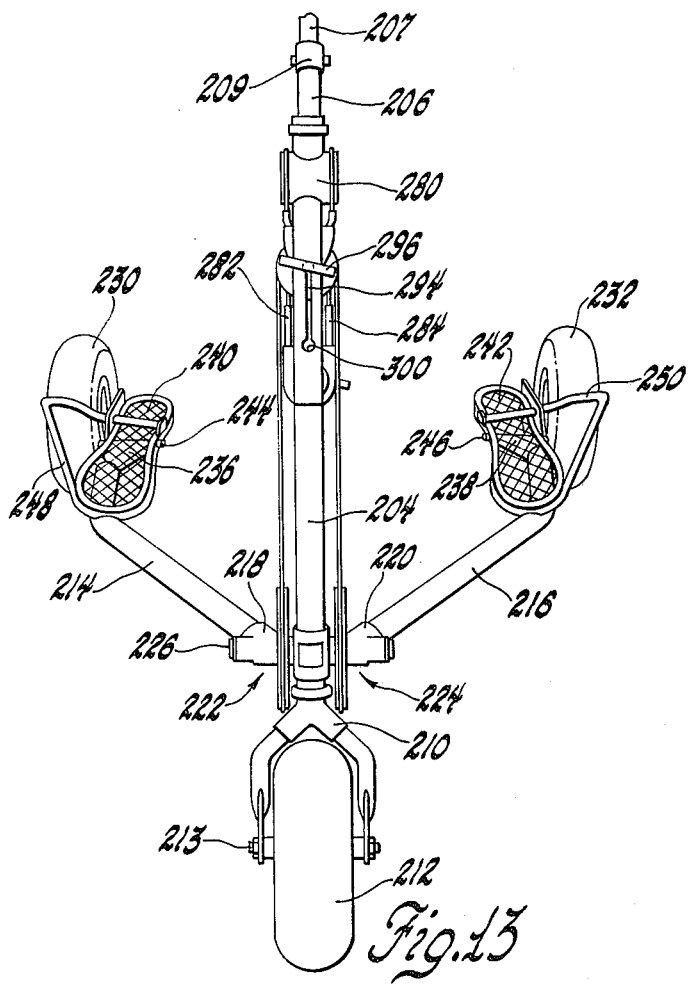
FIG. 13 is a frontal perspective view of the fifth embodiment of the invention.
Figure 14:
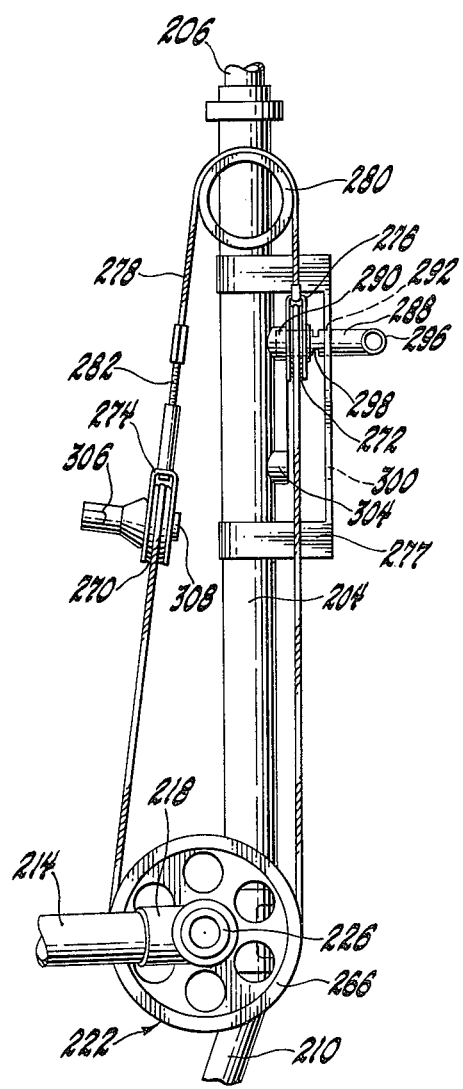
FIG. 14 is an enlarged side elevation view of a portion of the front frame of the vehicle of FIG. 11.

Right and left rear wheels 230 and 232 are rotatably mounted on axles which extend laterally and outwardly from the free end of trailing arms 214 and 216, respectively. In addition to supporting the rear wheels 230 and 232 the end of arms 214 and 216 have mounting brackets 236 and 238 secured respectively thereto for right and left foot pads 240 and 242 adapted to support a vehicle operator in a manner such as disclosed in connection with the embodiment of FIG. 1. As best shown in FIGS. 11 and 13, the foot pads 240 and 242 are located laterally inboard of the rear wheels 230 and 232 and are tiltably mounted on pivot pins 244 and 246 carried by brackets 236 and 238, respectively. Foot pad 240 disposed inboard of wheels 230 has an outwardly extending tubular friction brake member 248 secured thereto that directly engages the outer periphery of the wheel 230 when the pad is rocked rearwardly on pivot pin 244 by the operator to effect braking of wheel 230. In a forward tilt position of pad 240 the brake member 248 is spaced from wheel 230 as in the previous embodiments so that the wheel can freely rotate. In a like manner, foot pad 242 has an outwardly extending tubular brake member 250 secured thereto which is adapted to directly engage and brake the left rear wheel 232 when pad 242 is rocked rearwardly on pivot pin 246 by the vehicle operator. In the forward tilt position of this pad, the brake member is spaced from the wheel so that it may roll freely.

The trailing arms 214 and 216 are interconnected in a way so that the swinging of one arm on pivot shaft 226 in one direction will tend to swing the other arm automatically in the opposite direction. To this end the arms are mechanically interconnected by an endless cable 264 which extends around right and left side trailing arm pulleys 266 and 268 and a pair of transverse upper pulleys 270 and 272. Cable 264 leads from right side pulley 266 around pulley 270 and from pulley 270 around left side pulley 268. From pulley 268 the cable leads around upper pulley 272 and back to the right side pulley 266. Cable 264 is connected to pulleys 266, 268 and 270 by any suitable means to prevent slippage. The pulley 266 forms part of pulley assembly 222 and is rotatable by trailing arm 214; likewise, pulley 268 is part of pulley assembly 224 and is turned by rotation of trailing arm 216. Pulleys 270 and 272 are rotatably supported on clevises 274 and 276 which are adjustably interconnected by a cable 278. As shown, the cable 278 loops through the upper end of clevis 276 and straddling the tubular main frame 204 extends around the right and left sides of a transversely extending tubular shoulder 280 secured to the main frame 204. The terminal ends of cable 278 are connected by threaded cable tensioners 282 and 284 to the clevis 274.

Clevis 276 and its pulley 272 are adjustably mounted with respect to a bracket 277 secured to and extending along an upper portion of elongated tubular main frame 204. As shown, the pulley 272 and its associated clevis 276 are supported by a pivot pin 288 which extends through and rotatably supports pulley 272. The inner end of the pin 288 is removably seated in a cylindrical bearing 290 integral with tubular main frame 204 and extends outwardly from this bearing through the circular upper eye 292 of a keyhole slot 294. Pin 288 terminates in a handle 296 and has a necked or slotted intermediate portion 298 which fits within the narrow track of the keyhole slot 294. With this construction the operator can grasp handle 296 and pull the end of pin 288 out of bearing 290. The handle 296 can be subsequently turned to align the slotted portion 298 of the pin with the narrow track of the keyhole slot so that the clevis 276 and pulley 272 can be lowered as the main frame 202 is being tilted from the vehicle operating position of FIG. 11 to the stowed position shown in FIG. 12. When the lower eye 300 of the keyhole slot is reached, the pin 288 can be pushed inwardly into engagement with a lower bearing 304 integral with main frame 204. In this position the slotted portion 298 of the pin 288 is misaligned with respect to the narrow track of the keyhole slot so that the vehicle is latched in the stowed position. In a similar manner described in connection with the folding of the vehicle the pin 288 can be disengaged with the lower bearing 304 and the pin and clevis moved upwardly as the main frame is turned from the stowed position of FIG. 12 to the operating position of FIG. 11.

Pulley 270 can be prevented from turning to thereby hold the vehicle in an upright position by the manual turning of locking handle 306. By turning this handle, threaded means 308 is drawn toward the handle so that the sides of clevis 274 frictionally engage the sides of pulley 270 to lock the trailing arms together for vehicle parking or for stowage purposes.

Figure 15:
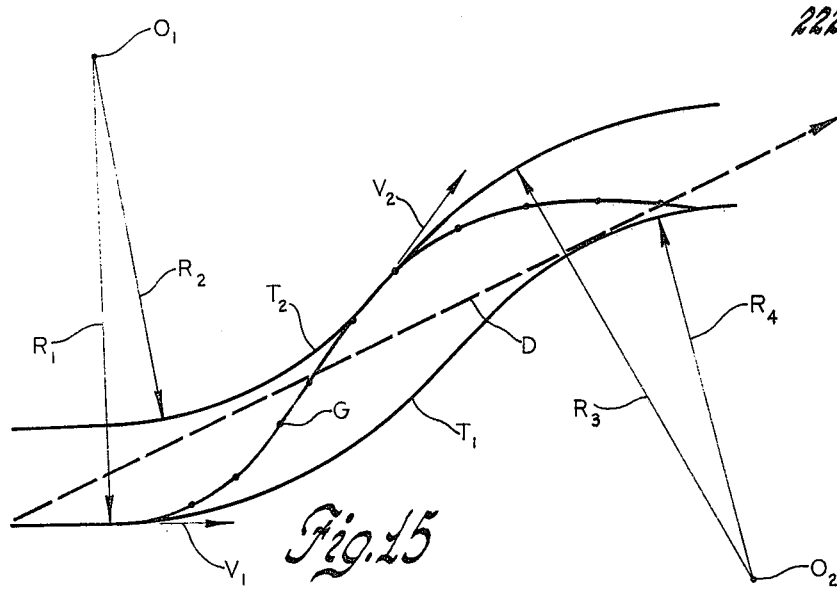
FIG. 15 is a diagram illustrating one mode of operation of the vehicle shown in FIG. 11.

In one preferred mode of operation of this embodiment of the invention, the operator can step on one foot pad using his other foot to push off the support surface to give the vehicle an initial velocity, shown as vector $V_1$ in FIG. 15. After pushing off, the operator places his feet on their respective foot pads so that operator input can be imparted into the vehicle for forward propulsion. Initially the operator distributes his weight to one foot and camber steers the vehicle in an arcuate path about a center point $O_1$ shown in the sinuous right and left tire paths $T_1$ and $T_2$. With the vehicle turning on such an arcuate path, the right rear wheel has a turning radius $R_1$ which is greater than the turning radius $R_2$ of the inside or left rear wheel. While holding the circular path of the vehicle substantially constant during this turning action and as he leans the vehicle into the turn the operator shifts his weight from his right to his left foot and thus to the left wheel. The shifting of the operator's center of gravity during this action is shown by curved path G in FIG. 15. Since the angular momentum has not changed, the shift of the operator's mass to a smaller radius will naturally result in an increase in vehicle velocity indicated as vector $V_2$. The operator subsequently cambers and steers the vehicle in an opposite direction so that it describes an arcuate path about another center point such as center point $O_2$. Since at the beginning of the second half of the operating cycle the mass of the operator is over the left rear wheel, velocity can be again increased by the operator shifting his weight from his left to his right foot. Thus the operator's mass is moved from radius $R_3$ to the smaller radius $R_4$ to again increase net velocity. By repeating this action a net forward travel of the vehicle is achieved as indicated by the directional arrow D in FIG. 15. The cambering of the vehicle during the work cycle facilitates operation. With cambering, the track of the vehicle is widened so that the amount of work per cycle is increased. The self propulsion is most effective on flat smooth surfaces where speeds approaching 20 m.p.h. may be obtained.

Figure 16:
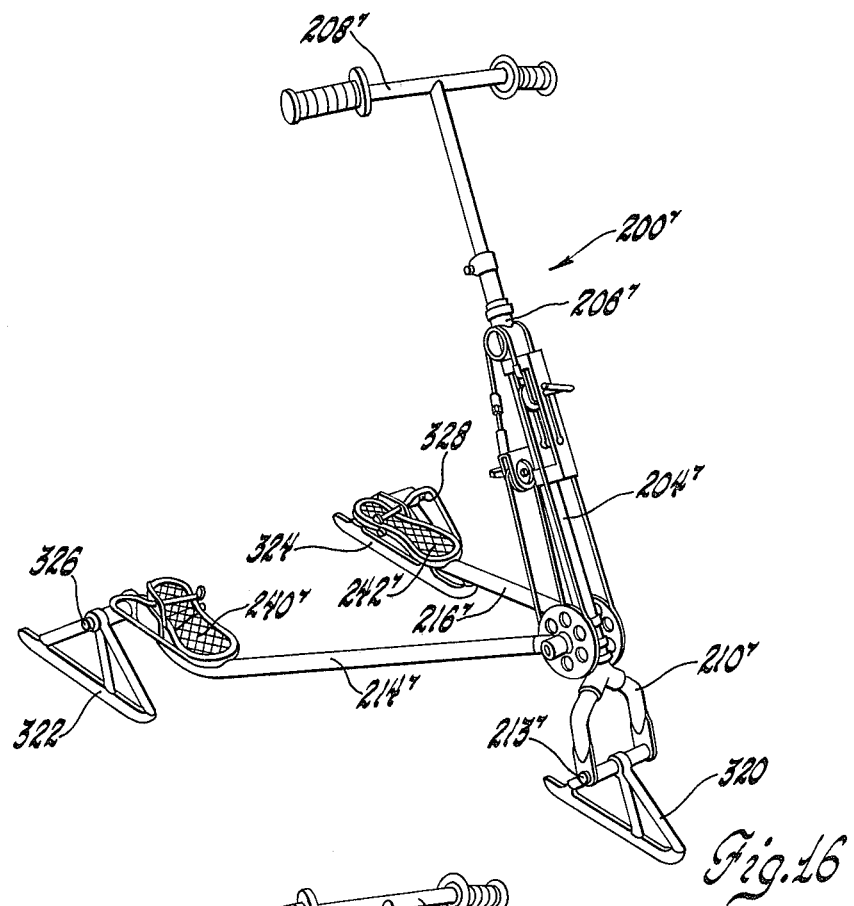
FIG. 16 is a perspective view of a vehicle similar to the vehicle shown in FIG. 11 but modified with wheels being replaced by ice skates.

While the manually propelled cambering vehicle has been thus far illustrated and described with wheels providing the three-point contact, ice runners or skates may be readily substituted for the wheels. Such a modification is shown in FIG. 16 in which vehicle 200' has frame and stabilizer elements which are basically the same as corresponding elements of the vehicle 200 of the FIG. 11 construction. This particular modification has a main frame 204' that supports tubular steering shaft 206'. Manual handlebar assembly 208' is operatively connected to the upper end of the steering shaft so that the steering shaft can be manually turned by the vehicle operator. The lower bifurcated end 210' of the steering shaft supports the transverse axle 213' on which ice skate 320 is mounted. In a like manner right and left ice skates 322 and 324 are secured on right and left axles 326 and 328 extending laterally from the end of the trailing arms 214' and 216' respectively. The cable and pulley stabilizer interconnection is the same as described in connection with the FIG. 11 construction so that further detailed description of this embodiment is not necessary.

In operation on a supporting ice surface, an operator (not shown) can distribute his body weight to the right and left foot pads 240' and 242' and provide a natural shift in weight between these two laterally spaced supports while manually steering the vehicle in a sinuous course to produce a net forward travel as described in connection with FIG. 15. As with the wheeled version, cambering of the vehicle is preferred when it is being powered by the successive weight shifts of the operator. Thus, as the operator shifts his weight from one foot to the other the vehicle is progressively rolled or cambered so that the track of the rear wheels is progressively increased (not illustrated in FIG. 15) during each half of the work cycle so that the amount of work is increased.

Figure 17:
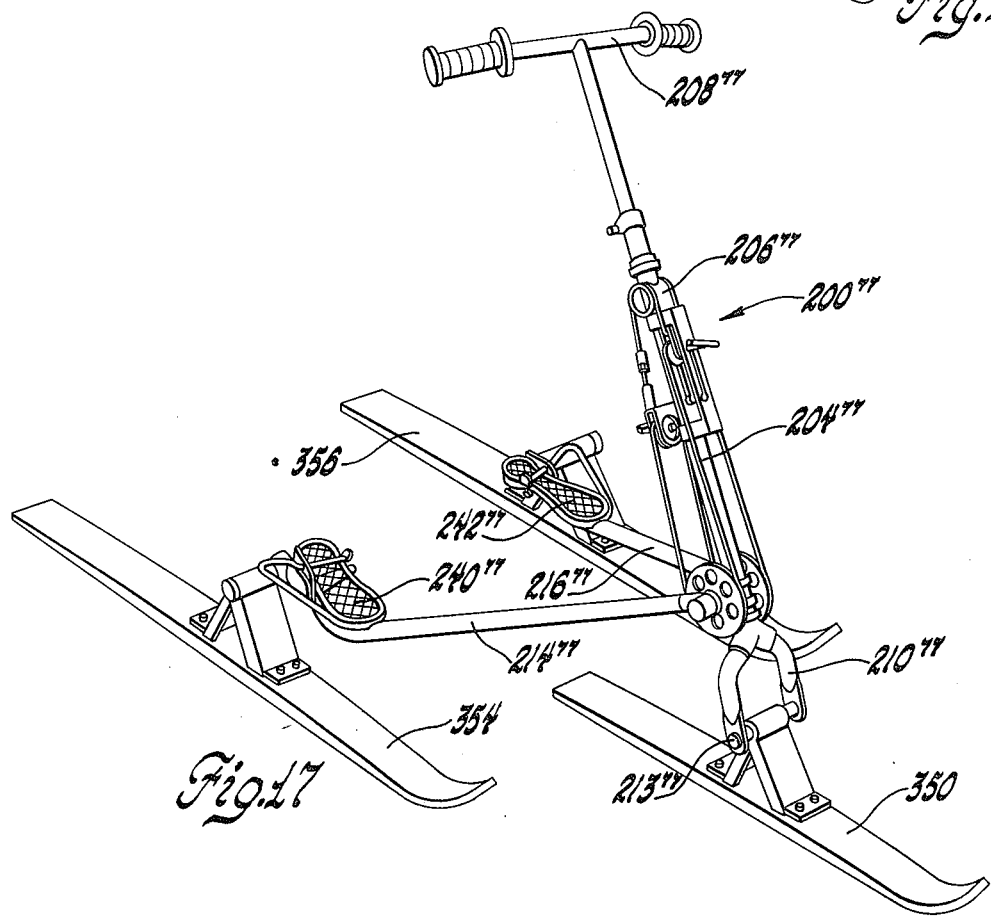
FIG. 17 is a perspective view of a vehicle similar to the vehicle of FIG. 11 but modified with wheels being replaced by snow skis.

Instead of ice skates, the vehicle of FIG. 11 may be readily provided with snow skis for downhill operation on snow. Such a modification is shown in FIG. 17 in which vehicle 200" has a main frame 204" that supports the tubular steering shaft 206". Manual handlebar assembly 208" is operatively connected to the upper end of the tubular steering shaft. The lower bifurcated end 210" of the steering shaft supports the transverse axle 213" on which snow ski 350 is mounted. Right and left snow skis 354 and 356 are secured on the transverse right and left axles carried by the trailing arms 214" and 216" respectively. As in the other embodiments the cable and pulley stabilizer interconnection between the two trailing arms is the same as described in connection with FIG. 11 and further description is not needed.

In downhill operation, the operator can stand on the foot pads 240" and 242" and distribute his body weight as he begins the downhill run on snow. With the steering input provided by the manual manipulation of the handlebars 208" and with the improved lateral and fore and aft stability provided by this vehicle, the operator can perform the same basic cambering turns and other maneuvers as a skier with snow skis attached to his feet. With the improved stability and maneuverability provided by this vehicle, a novice operator can readily traverse a slope performing turns as an experienced skier can accomplish with foot mounted snow skis. While this invention can be used by novice skiers as a training aid to learn the art of skiing, it may also be used by the more experienced skiers as a recreational vehicle. While the vehicle has been described with foot pads on the trailing arms various modifications can be made so that the feet of the operator are supported directly on the rear skis which in turn are pivoted to the ends of the trailing arms.

The detailed description and illustrations of the preferred embodiments of this invention for the purpose of explaining the principles thereof are not to be considered as limiting or restricting the invention since many modifications may be made by the exercise of skill in the art without departing from the scope of the invention as set forth in the following claims.

I claim:

1. A three-wheel cambering vehicle comprising a frame having a forward portion and a pair of elongated trailing arms which extend rearwardly from said forward portion of said frame and which terminate in end portions, pivot means pivotally connecting front end portions of said trailing arms to said forward portion of said frame to support said arms for up and down swinging movement, a bell crank pivoted to said forward portion of said frame in spaced relation to said pivot means and extending in a direction generally transverse with respect to said trailing arms, linkage means connecting each of said trailing arms to said bell crank, said frame having an upwardly extending steering shaft rotatably and steerably mounted to said forward portion of said frame, a front wheel rotatably mounted at the lower end of said steering shaft, manual steering means having a grip portion and connected to the upper end of said steering shaft, and a rear wheel for each of said trailing arms rotatably mounted at the rear end portions thereof, said pivot means for said trailing arms being located forwardly of the grip portion of said manual steering means, said end portions of said trailing arms having foot rest means thereon wide enough to receive the feet of an operator and support the operator in a natural upright standing position to enable said operator to manually grasp the grip portion of said manual steering means and camber the vehicle by leaning to one side thereof to cause one of said trailing arms to move in one direction and the other of said arms to move in an opposite direction to thereby effect equal camber of said rear wheels.

2. A three-wheel cambering vehicle comprising a frame having a forward portion, a pair of elongated trailing arms extending rearwardly from said forward portion of said frame in a laterally spaced side by side relationship, forward pivot connection means pivotally connecting one end of each of said arms to said forward portion of said frame so that said trailing arms extend rearwardly and swing in an up and down movement about said forward pivot connection means, a bell crank extendible in a direction transverse with respect to said trailing arms, pivot means pivotally mounting said bell crank to said forward portion of said frame in spaced relation to said forward pivot connection means for said trailing arms, each of said trailing arms being connected to said bell crank by a link and by first pivot means, each of said links extending rearwardly from said bell crank to a pivot connection with the trailing arm rearward of said first pivot means to support the forward portion of said frame at a fixed rake angle, an elongated steering shaft rotatably and steerably mounted to said forward portion of said frame, a front wheel operatively connected to the lower end of said steering shaft, manual steering means having a grip portion and connected to the upper end of said steering shaft, a rear wheel for each of said trailing arms rotatably mounted at the rearward portions thereof, said rearward portions having operator foot support means thereon each of sufficient width to receive a foot of an operator to enable said operator to stand upright in a natural manner thereon and manually grasp the grip portion of said steering means and camber the vehicle as desired by tilting said manual steering means from one side or the other while maintaining a naturally balanced posture, said forward pivot connection means for said trailing arms being forwardly of the grip portion of said manual steering means and closer to the front wheel than to the rear wheels and foot supports.

3. A three point contact cambering vehicle having a longitudinally extending roll axis comprising a frame having a forward portion, an elongated steering shaft mounted for turning movement on said forward portion of said frame, a steerable front contact means operatively connected to the other end of said steering shaft having hand grips, said frame further comprising a pair of elongated trailing arms extending rearwardly from said forward portion of said frame, laterally spaced rear contact means operatively connected to end portions of said trailing arms for engagement with the support surface, foot support means of sufficient width to receive a foot of an operator of the vehicle mounted on each of said trailing arms adjacent to each of said rear contact means, and pivot means forwardly of said hand grips of said manual steering device for swingably mounting said trailing arms to said forward portion of said frame on an axis extending laterally thereof to permit said trailing arms to swing in separate planes allowing the operator while standing in a natural upright manner on said foot support means and manually gripping said hand grips of said manual steering device to roll said vehicle with respect to said roll axis and cause said arms to move through equal amounts in opposite directions so that the rear contact means camber by an amount equal to vehicle roll.

4. A three-wheel cambering vehicle having a midpoint between the three wheels thereof and having a longitudinally extending roll axis comprising a frame with a forward portion and a pair of trailing arms, an elongated steering shaft mounted for turning movement on said forward portion, a steerable front wheel operatively connected to one end of said steering shaft for engagement with the ground, manual steering means operatively connected to the other end of said steering shaft, said manual steering means having grip portions for receiving the hands of an operator, said trailing arms being laterally spaced from each other and extending rearwardly from said forward portion, rear wheel means operatively connected to rear end portions of said trailing arms for engagement with the ground, foot support means for a vehicle operator mounted on each of said trailing arms adjacent to each of said rear wheel means to permit the operator to stand in a natural upright manner thereon rearward of said forward portion of said frame and manually grasp said grip portions of said manual steering means, pivot shaft means forward of the mid-point of the vehicle and adjacent to said front wheel swingably mounting said trailing arms to said forward portion of said frame to permit said trailing arms to relatively swing in separate movable planes on opposite sides of the roll axis so that the operator can selectively impress foot loads through said foot support means and roll said vehicle with respect to said longitudinal roll axis and cause said arms to move in said separate planes and said rear wheels to camber by an amount equal to vehicle roll for camber steering.

5. A three wheel cambering vehicle having a midpoint between the three wheels thereof and having a longitudinally extending roll axis comprising a frame with a forward portion, an elongated steering shaft supported for turning movement with respect to said forward portion of said frame for rotation with respect to an axis through said steering shaft, a wheel fork operatively connected to said steering shaft, a steerable front wheel, axle means operatively connecting said front wheel to said fork for rotation about an axis generally perpendicular to said axis through said steering shaft, motor means for driving said front wheel, manual steering means operatively connected to the other end of said steering shaft, said frame having first and second trailing arms extending rearwardly from said forward portion, laterally spaced foot supports on the rearward ends of said trailing arms for supporting a vehicle operator in a natural upright standing position, laterally extending pivot means forward of the mid-point of the vehicle and closely adjacent to said front wheel and forward of the center of gravity of the standing vehicle operator and operatively connecting the forward end portions of said trailing arms to said forward portion of said frame for limited turning movement with respect to an axis through said pivot means, a rear wheel for each of said trailing arms, first and second axle means respectively mounting said rear wheels for rotation about a lateral axis through said respective trailing arms near the rearward ends thereof, support linkage means operatively connecting said trailing arms to each other and to said forward portion of said frame so that said trailing arms move in opposite directions and by equal amounts when said vehicle is rolled with respect to said roll axis and said rear wheels camber by an amount equal to vehicle roll, and brake means mounted on said spaced foot supports of said trailing arms for selectively frictionally engaging said rear wheels.

6. A cambering vehicle comprising a frame forming a forward portion of the vehicle, an elongated steering shaft supported by said main frame for limited turning movement with respect thereto, manual steering means operatively connected to the upper end of said steering shaft, a steerable front drive wheel operatively connected to the lower end of said steering shaft and movable to an infinite number of positions in response to the corresponding turning movement of said steering shaft, motor means for driving said front drive wheel, a pair of spaced trailing arms each having one end pivotally secured to said forward portion for limited upwardly and downwardly turning movement, a rear wheel operatively secured to a free end portion of each trailing arm, operator foot rest means on each of said free end portions for supporting a vehicle operator in a natural upright standing position while manually gripping said manual steering means, braking means secured to each of said foot rest means, means pivotally connecting said foot rest means for tilting movement by the operator with respect to said trailing arms between a forward tilt position whereby increased weight of the operator is impressed through said manual steering means and said steering shaft on the front drive wheel for increased vehicle traction and a rearward tilt position whereby the operator's center of gravity is varied and a portion of the load is removed from the drive wheel for reduced traction and vehicle drive and applied to the rear wheels through said braking means by direct contact of said braking means with said rear wheels for braking said vehicle.

7. A cambering vehicle comprising a main frame forming a front portion of the vehicle, a steerable front wheel, support means pivotally mounting said steerable wheel to said main frame, steering means operatively connected to said steerable wheel, manual grip means connected to said steering means for manually turning said steering means and said steerable wheel to steer said vehicle, a pair of spaced arms extending from front points on opposite sides of said main frame, pivot means adjacent said steerable wheel pivotally connecting one end of each of said arms to said frame for swinging up and down movement in separate planes, means interconnecting said spaced arms and said frame to support said arms and permit said arms to simultaneously swing in opposite directions, a rear wheel rotatably supported at the other end of each of said arms, and foot rest means pivoted on each of said arms adjacent to each of said rear wheels supported by said arms of sufficient width to operatively receive the feet of a vehicle operator so that the vehicle operator can stand in a natural upright position on the foot rest means of said vehicle and manually grasp said grip means and naturally shift his weight and body position to maintain vehicle stability and to camber the vehicle and wheels, said pivot means for said arms being forward of said manual grip means and closer to said steerable front wheel than to said rear wheels and said foot rest means incorporating braking means for engagement with said rear wheels when pivoted in a rearward direction.

8. A cambering vehicle comprising a main frame, a steerable wheel, support means pivotally mounting said steerable wheel to said main frame, manual means including manual grip means operatively connected to said steerable wheel for manually turning said steerable wheel to steer said vehicle, a pair of spaced arms extending from opposite sides of said main frame, pivot means forward of the center of gravity of an operator standing upright in a natural position on the vehicle pivotally connecting one end of each of said arms to said frame for swinging movement in separate planes, a wheel rotatably supported at the other end of each of said arms, and foot rest means on each of said arms closely adjacent to said wheels supported by said arms to operatively receive and fully accommodate the feet of a vehicle operator so that the vehicle operator can naturally stand in an upright manner on the vehicle and manually grasp said grip means and shift his center of gravity and body position to maintain vehicle stability at rest and to camber the vehicle and wheels when in motion.

9. In a three point support cambering vehicle a frame construction comprising a main frame for a forward support, a pair of elongated trailing arms for the other two and rearward supports, pivot means pivotally connecting a forward portion of each of said arms to opposite sides of said main frame on a common lateral axis and so that said arms extend rearwardly therefrom, a mechanical cambering interconnection between said trailing arms and supported by said main frame, said mechanical cambering interconnection being such that any forced pivotal movement of one trailing arm in one direction relative to said main frame will effect a like pivotal movement of the other trailing arm in an opposite direction relative to said main frame, and manual force input means provided by foot pads on each of said trailing arms adjacent the free ends thereof to permit an operator to stand upright in a natural manner with his feet on said foot pads and naturally shift his body weight from one foot pad to the other to thereby camber said frame construction of the vehicle, said axis of the trailing arm pivots being forward of a center of the three support points and closer to the forward support than to the foot pads and other two supports.

10. A cambering vehicle having a manually steerable forward contact and a pair of laterally spaced rear contacts for full time engagement with a supporting surface and comprising an upright main frame, manual steering means supported by said main frame first and second elongated trailing arms located on opposite sides of said main frame and having fore and aft ends, a forward pivotal connection between the fore end of each arm and said main frame, the pivotal connections between the fore ends of said arms and said main frame being coaxial, said arms extending rearwardly from said main frame with the aft end of each arm being located a substantial distance rearwardly of said main frame and said forward pivotal connection so that said forward pivotal connection is forward of the center of gravity of a vehicle operator standing on said frame and adjacent to said forward contact, the aft ends of said arms being laterally spaced apart a substantial distance, a mechanical cambering interconnection carried by said main frame and operatively interconnected to the fore ends of said arms such that any forced swinging movement of one arm in one direction relative to said main frame will effect an equal swinging movement of the other arm in the opposite direction relative to said frame, and a manual force input on each of said arms adjacent the aft ends thereof provided by left and right foot support means to permit an operator to physically stand upright in a natural manner thereon and grip said manual steering means and camber said frame construction of the vehicle.

11. A three-point cambering vehicle having a longitudinally extending roll axis comprising an upright main frame, manual steering means supported by said main frame, a pair of elongated trailing arms connected to opposite sides of said main frame on a common lateral axis and extending rearwardly therefrom and terminating in ends located a substantial distance rearwardly of said main frame and laterally spaced on opposite sides of said main frame, pivot means pivotally connecting said trailing arms for swinging movement in separate planes, foot rest means mounted on said arms adjacent the free ends thereof to support a vehicle operator in a natural upright standing position thereon and grip said manual steering means and with the operator's center of gravity being rearward of said pivot means, and a mechanical cambering interconnection between said trailing arms and supported by said main frame, said mechanical cambering interconnection being such that any manual forced pivotal movement of one arm relative to said main frame through its foot rest means as impressed by a vehicle operator standing thereon will effect a like pivotal movement of the other arm in an opposite direction.

12. A three place contact snow ski vehicle comprising steerable front ski means, main steering shaft means extending upwardly at a predetermined rake angle from said front ski means, pivot means connecting said front ski means to said steering shaft means for pivotal movement about a laterally extending axis, upwardly extending main frame means supporting said steering shaft means for pivotal movement with respect to a steering axis, manual grip means engaged by the hands of an operator of the vehicle and operatively connected to the upper end of said steering shaft for turning said steering shaft and said front ski means, a pair of laterally spaced arms extending rearwardly from said main frame means, pivot means adjacent to said front ski means and forward of said manual grip means mounting each of said arms to said main frame means for up and down swinging movement in separate planes, laterally spaced rear ski means for each of said arms, pivot means suspending and pivotally supporting each of said rear skis to end portions of each of said arms for pivotal movement with respect to laterally extending axis means, stabilizer means interconnecting said main frame means and said arms to support said main frame at said predetermined rake angle, and foot rest means adjacent to the ends of each of said arms and to said rear ski means to receive the feet of a vehicle operator allowing the operator to stand in a natural upright manner on said foot rest means and physically grip said manual grip means with his hands and operate said vehicle by cambering said vehicle and ski means in a manner to traverse and descend a snow covered slope.

13. A three place contact snow ski vehicle comprising steerable front ski means disposed along a centralized longitudinal axis of the vehicle, a main steering shaft extending upwardly at a predetermined rake angle from said front, pivot means pivotally mounting said front ski means to said steering shaft for pivotal movement with respect to a lateral axis, main frame means supporting said steering shaft for pivotal movement with respect to a steering axis, manual steering means operatively connected to said steering shaft for turning said steering shaft and said front ski means for steering said vehicle, said steering means having manual gripping portions, a pair of spaced arms extending rearwardly from opposite sides of said main frame means, pivot means adjacent to and above said front ski means and forward of said manual gripping portions for pivotally connecting one end of each of said arms to said main frame means for up and down swinging movement in separate planes on opposite sides of said main steering frame, rear ski means pivotally supported at the other end of each of said arms on opposite sides of the longitudinal axis of the vehicle, stabilizer means interconnecting said main frame means and said arms to support said main frame at said predetermined rake angle, and foot rest means on each of said arms adjacent to the ends thereof and supported by said arms to operatively receive the feet of a vehicle operator so that the vehicle operator can stand in an upright and natural manner with his feet apart on said foot rest means and grip said manual gripping portion and operate said vehicle by leaning and camber steering said vehicle and skis with manual forces being selectively exerted by said operator through said foot rest means directly to said rear ski means while traversing and descending a snow covered slope.

14. A cambering three place contact snow ski vehicle comprising steerable front ski means disposed along a centralized longitudinal axis of the vehicle, a main steering shaft extending upwardly at a predetermined rake angle from said front ski means, pivot means pivotally mounting said front ski means to said steering shaft for limited turning movement about an axis transverse to said steering shaft, main frame means supporting said steering shaft for pivotal movement with respect to a steering axis, manual steering means operatively connected to said steering shaft for turning said steering shaft and said front ski means for steering said vehicle, left and right side arms extending rearwardly from opposite sides of said main frame means and terminating in free end portions laterally spaced and on opposite sides of said longitudinal axis of the vehicle, front pivot means forward of said manual steering means for pivotally connecting one end of each of said arms to said main frame means for up and down swinging movement in separate planes on opposite sides of said main steering frame, left and right side rear ski means, pivot means at the free ends of each of said arms for pivotally mounting said left and right side rear ski means for rocking movement about a laterally extending axis, stabilizer means interconnecting said main frame means and said arms to support said main frame at said predetermined rake angle and to provide for the equal and opposite movement of said arms when said vehicle is cambered and left and right foot rest means on each of said arms adjacent to the ends thereof and supported by said arms to operatively receive the feet of a vehicle operator so that the vehicle operator can stand in a natural upright manner with his left and right feet apart respectively on said left and right foot rest means and grip said manual steering means and operate the vehicle by leaning and camber steering said vehicle and skis with manual forces being selectively exerted from one rear ski means to the other by the vehicle operator through said foot rest means while traversing and descending a snow covered slope.

15. A cambering three place contact vehicle for operation on an ice surface comprising steerable front ice skate means disposed along a centralized longitudinal axis of the vehicle, a main steering shaft extending upwardly at a predetermined rake angle from said front ice skate means, means mounting said front ice skate means to said steering shaft, main frame means supporting said steering shaft for pivotal movement with respect to a steering axis, manual steering means operatively connected to said steering shaft for turning said steering shaft and said front ice skate means for steering sadi vehicle, a pair of spaced arms extending rearwardly from opposite sides of said main frame means, forward pivot means located in front of said manual steering means for pivotally connecting one end of each of said arms to said main frame means for up and down swinging movement in separate planes on opposite sides of said main steering frame, rear ice skate means supported at the other end of each of said arms on opposite sides of the longitudinal axis of the vehicle, stabilizer means interconnecting said main frame means and said arms to support said main frame at said predetermined rake angle, and foot rest means on each of said arms adjacent to the free ends thereof of dimensions to accommodate the foot prints of a vehicle operator and supported by said arms to operatively receive the feet of a vehicle operator so that the vehicle operator can stand in a natural and upright manner with his feet apart on said foot rest means and manually grip said manual steering means and camber said vehicle by leaning and camber steering said vehicle and ice skates with manual input forces being selectively exerted through said foot rest means.

* * * * *

UNITED STATES PATENT AND TRADEMARK OFFICE
CERTIFICATE OF CORRECTION

PATENT NO. : 4,087,106

DATED : May 2, 1978

INVENTOR(S) : Frank J. Winchell

It is certified that error appears in the above–identified patent and that said Letters Patent are hereby corrected as shown below:

```
Title page, add the following references:
    2,593,974   4/1952   Brown              280/21R
    3,506,080   4/1970   Hott et al         180/26R
    3,352,570  11/1967   Cordrey            280/282
    2,316,272   4/1943   Meyer              280/14
    3,480,289  11/1969   Larkin             280/21R
    3,289,780  12/1966   Ferris             180/26R
    3,033,585   5/1962   Marston et al      280/12.1XR
    3,326,569   6/1967   Leeming            280/17XR
    3,799,565   3/1974   Burtis et al       280/282XR
    3,656,775   4/1972   Krautter           280/16
    3,841,649  10/1974   McMullen           280/16
    4,942,586  11/1974   Japan Oki          280/87R
      169,408   3/1951   Austria Mitterbach 280/21R
      370,923   3/1939   Italy   Thum       280/16
      178,275   9/1953   Austria Brenter    280/16
```

Column 8, line 8, "skiis" should read -- skis -- .

UNITED STATES PATENT AND TRADEMARK OFFICE
CERTIFICATE OF CORRECTION

PATENT NO. : 4,087,106
DATED : May 2, 1978
INVENTOR(S) : Frank J. Winchell

It is certified that error appears in the above-identified patent and that said Letters Patent are hereby corrected as shown below:

Column 13, line 43, after "to" insert -- one end of said steering shaft for engagement with a support surface, a manual steering device operatively connected to -- .

Column 15, line 44, after "arms" insert -- and -- .

Column 17, line 52, after "said" delete "from" and insert -- front -- .

Column 18, line 66, "sadi" should read -- said -- .

Signed and Sealed this

Twenty-second Day of May 1979

[SEAL]

Attest:

RUTH C. MASON
Attesting Officer

DONALD W. BANNER
Commissioner of Patents and Trademarks